(12) United States Patent
Wang et al.

(10) Patent No.: US 7,555,420 B2
(45) Date of Patent: Jun. 30, 2009

(54) METHOD AND SYSTEM FOR NETWORK EMULATION

(75) Inventors: Jian Wang, Beijing (CN); Zheng Ni, Beijing (CN); Marco Piumatti, Redmond, WA (US); Ramakrishnan L. Peruvemba, Redmond, WA (US); James R. Boldman, Duvall, WA (US); Ivan Davtchev, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 10/951,985

(22) Filed: Sep. 28, 2004

(65) Prior Publication Data

US 2006/0072466 A1  Apr. 6, 2006

(51) Int. Cl.
*G06F 9/455* (2006.01)
(52) U.S. Cl. .................. 703/23; 719/328; 709/220; 370/241
(58) Field of Classification Search .......... 703/23; 719/328; 709/220; 370/241
See application file for complete search history.

(56) References Cited

U.S. PATENT DOCUMENTS 7,206,314 B2 * 4/2007 Liao et al. .................. 370/401

2004/0024924 A1 * 2/2004 Szewerenko et al. .......... 710/1

OTHER PUBLICATIONS

Pei Zheng, Empower: A Cluster Architecture Supporting Network Emulation, Jul. 2004, IEEE Transactions on Parallel and Distributed Systems, vol. 15, No. 7, pp. 617-628.*

* cited by examiner

*Primary Examiner*—Ricky Ngo
*Assistant Examiner*—Kibrom T Hailu
(74) *Attorney, Agent, or Firm*—Merchant & Gould, P.C.

(57) ABSTRACT

A system and method for emulation of a network link include an application programming interface (API) for testing distributed applications by way of a network emulator. According to aspects of the invention, a method and computer program product are disclosed for providing an interface to a user application for configuring a network emulator. According to another aspect of the invention, a system for configuring a network emulator by way of a user application is provided. The API includes exposed functions for creating a virtual channel, creating a virtual link in the virtual channel, deleting the virtual channel, deleting the virtual link, obtaining trace data, obtaining a packet filter for the virtual channel, obtaining a link rule and the number of instances of the virtual link, initializing the emulator, modifying the virtual channel, modifying the virtual link, setting trace information for the emulator, shutting down the emulator, and stopping the emulation.

29 Claims, 5 Drawing Sheets

METHOD AND SYSTEM FOR NETWORK EMULATION

FIELD OF THE INVENTION

The present invention relates generally to computer systems and computer networks, and more particularly to systems and methods for emulating network links.

BACKGROUND OF THE INVENTION

Links across interconnected networks vary substantially with respect to such factors as bandwidth, packet latency, error and loss rates, and network medium (asymmetric or symmetric broadband, analog dialup, wireless networks, etc.). Before network protocols and distributed applications are deployed in a real network, it is critical that they be thoroughly tested under various realistic network conditions, to ensure correctness and to verify performance characteristics. Testing in an isolated real network is generally impractical. Therefore, testing typically involves simulation and emulation.

Network simulators generally attempt to provide a rich set of protocol modules and configuration tools suitable for conducting customized simulation experiments. However, network simulation suffers from a number of limitations. Simulators rely principally on models of both the physical network infrastructure and networking protocols. Models by definition only approximate the real conditions being tested, and in complex situations it is often impossible to develop accurate models for purposes of simulation. The functionalities provided by simulation modules are merely logical operations; thus, an implementation in a simulator must be modified before it can be deployed within a target network. Network simulators consume significant resources when the network being simulated is sufficiently large, and they do not provide a view of the network end user's experience.

By contrast, network emulators permit applications and protocols to be tested in real time, on real machines, such as locally-linked computers, using real implementations of network protocols. An emulator includes a supplementary means for imposing synthetic delays and faults on the real network traffic. In effect, the emulator comprises a virtual network with respect to the host machine or machines on which the network applications being tested are running. For a network emulator to be useful, however, it is necessary that it be designed and structured in such a way that various large-scale network conditions may be emulated accurately and realistically as well as efficiently and economically.

SUMMARY OF THE INVENTION

The present invention is generally directed towards a system and method for emulation of a network link. In accordance with certain embodiments of the invention, an application programming interface is provided for testing distributed applications by way of a network emulator. According to aspects of the invention, a method and computer program product are disclosed for providing an interface to a user application for configuring a network emulator. According to another aspect of the invention, a system for configuring a network emulator by way of a user application is provided. The application programming interface includes exposed functions for creating a virtual channel, creating a virtual link in the virtual channel, deleting the virtual channel, deleting the virtual link, obtaining trace data, obtaining a packet filter for the virtual channel, obtaining a link rule and the number of instances of the virtual link, initializing the emulator, modifying the virtual channel, modifying the virtual link, setting trace information for the emulator, shutting down the emulator, and stopping the emulation.

Embodiments of the invention implemented in hardware, software, and combinations thereof are contemplated.

DETAILED DESCRIPTION OF THE INVENTION

The present invention includes a network emulator framework within which real network traffic, such as IP traffic, is processed in order to achieve realistic and accurate emulation results based on user-configured settings. Emulation procedures occur in kernel mode on an emulator link, which comprises a virtual network link. A plurality of emulation algorithms are employed, based on well-formed mathematical models for emulation of various network characteristics and conditions, including bandwidth, queue, packet loss, latency, error propagation, packet out-of-order, and background traffic. The invention is usable for emulation of wired and wireless network scenarios. In one embodiment, the invention provides a flexible software-based network emulator for use in a conventional general-purpose computing system, although embodiments incorporating the invention wholly or partly in hardware or in special-purpose devices are also contemplated. A network emulator in accordance with the invention provides per-connection emulation as well as non-connection-based emulation. An application programming interface is exposed for configuration of the emulator.

A programming interface may be viewed as any mechanism, process, or protocol for enabling one or more segments of code to communicate with or access the functionality provided by one or more other segments of code. Aspects of such a programming interface may include a method whereby a first code segment transmits information in the broadest sense to a second code segment, a method whereby the second code segment receives the information, and the structure and content of the information. This notion of a programming interface, as well as other techniques for implementing a programming interface, is known to those having skill in the art and is clear from the detailed description of the invention contained herein.

Figure 1:
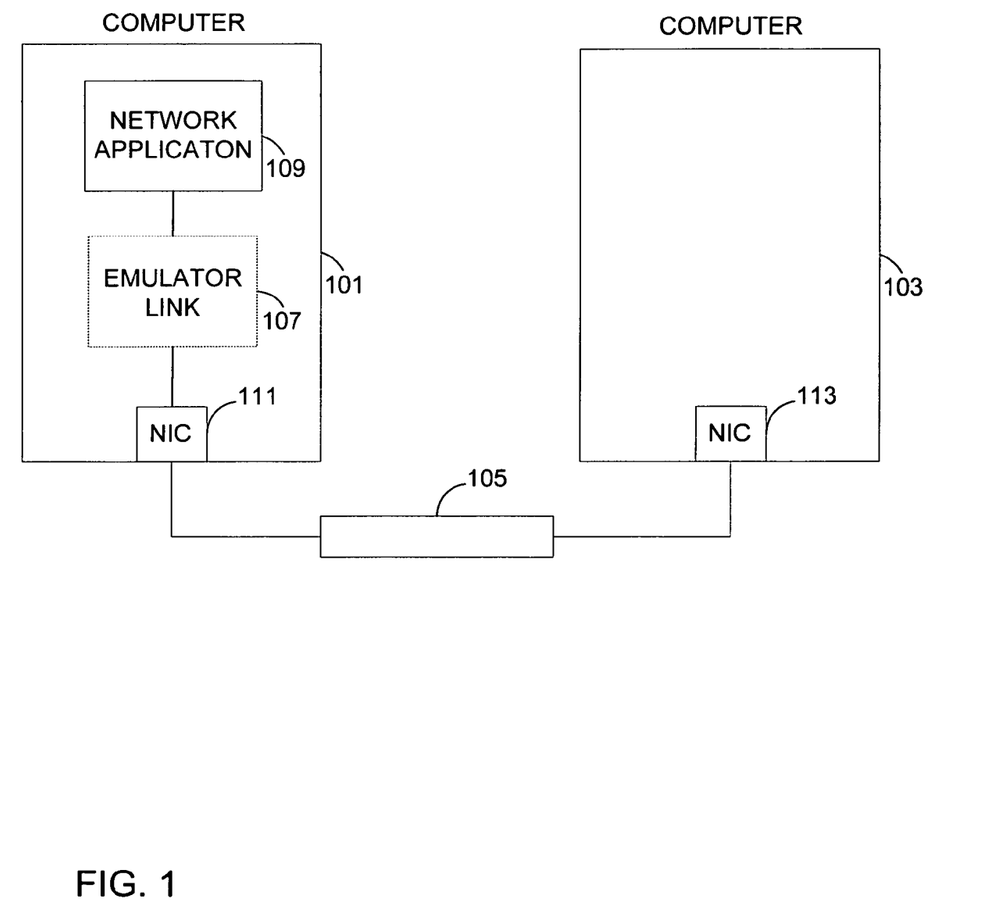
FIG. 1 is a block diagram providing a simplified illustration of one possible environment in which the present invention may be incorporated.

Turning to the drawings, FIG. 1 provides a simple illustration of one possible environment in which the present invention may be incorporated. Two computers 101, 103, each having one or more network interface cards (NICs) 111, 113, are linked by way of a local network connection 105, as for example an Ethernet link. The computers 101, 103 may be computing machines of various sorts, such as personal computers, servers, workstations, portable computers, special-purpose computing devices, and the like, having appropriate network interfaces, as well as, at a minimum, such components as a processor, memory storage, and input and output interfaces. In a representative environment one computer, such as the computer 101, runs a server program, such as a TCP or UDP server, and another machine, such as the computer 103, runs a client program, such as a TCP or UDP client. The features of the various computing devices within which the invention may be incorporated are rudimentary to those having skill in the art and need not be described at length here.

At least one of the computers 101, 103, for example the computer 101, by executing one or more appropriate computer programs in accordance with the invention, establishes an emulator link 107. The emulator link 107 comprises a virtual network link operating upon outgoing or incoming data packets transmitted by or directed towards the computer 101, as by a network application 109 running on the machine 101. Those having skill in the art will appreciate that many other operating environments are possible, including those involving more than two computers generating network traffic, as well as those involving a single computer, and those involving emulation programs executing on more than one computer. Thus the environment depicted in simplified form in FIG. 1 should not be taken as limiting. Moreover, the emulator link may be established by an intermediary device acting as a router or bridge intercepting network traffic between two machines linked thereto.

Overview of Network Emulator Architecture

Figure 2:
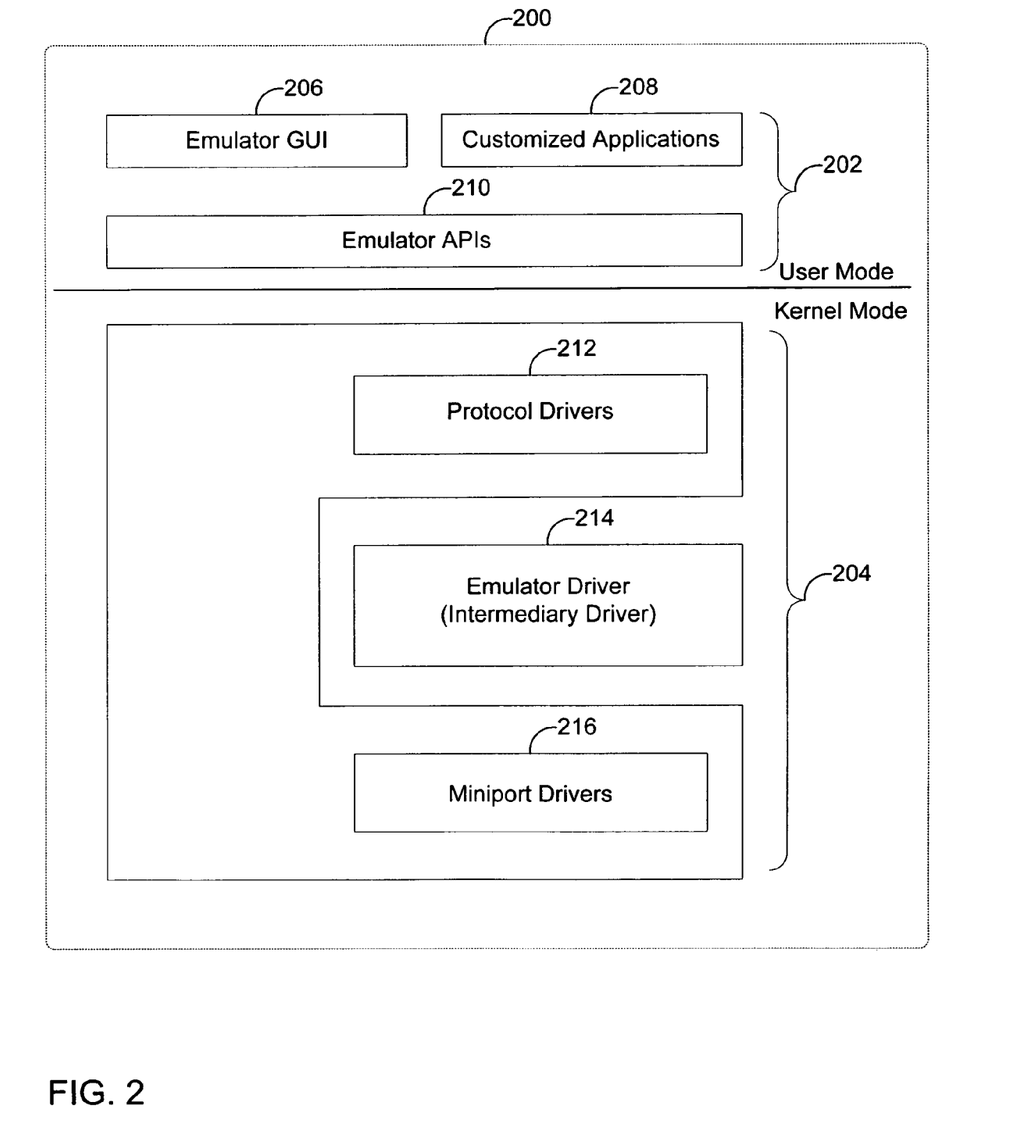
FIG. 2 is a diagram providing a general view of the architecture of a network emulator in accordance with the invention.

FIG. 2 shows a general view of the architecture of a network emulator in accordance with the present invention. The network emulator 200 comprises two parts, a user-mode application part 202 and a kernel-mode driver part 204.

The user-mode part 202 includes as its principal component the emulator application programming interface (API) 210. A user can write customized applications 208 invoking functions exposed in the API 210. In this way, the user supplies parameters to the modules of the driver part 204 in order to configure and control the emulator 200. The emulator 200 supports a dynamic profile enabling emulation of various kinds of network links, such as GPRS, broadband, or 56 Kbps modem. A graphical user interface utility 206 is provided for convenient setup of emulation parameters, to run and stop the emulation, and to monitor the emulation results.

The core emulation procedures of the network emulator 200 are performed by a plurality of modules residing in the kernel-mode component 204. An emulator driver 214 captures all packets sent and received by the host in which the emulator is installed. The emulator driver 214 processes the captured packets in accordance with given emulation parameters. After processing the packets, the emulator driver 214 sends the packets out in accordance with the emulation results. In one embodiment the emulator driver 214 is an NDIS intermediate driver situated above miniport drivers 216 and below network protocol drivers 212 in a layered network driver architecture.

The implementation of core emulation procedures in kernel mode enables the emulator 200 to achieve high performance. In one embodiment the emulator 200 is able to emulate bandwidth higher than 90 Mbps on 100 Mbps Ethernet and higher than 300 Mbps on Gigabit Ethernet. The user-mode part 202 is reserved principally for monitoring and control purposes. The network emulator 200 thus avoids the performance bottleneck that results from performance of emulation in user-mode, due to the overhead of context switches.

Core Components of the Emulator Driver

Figure 3:
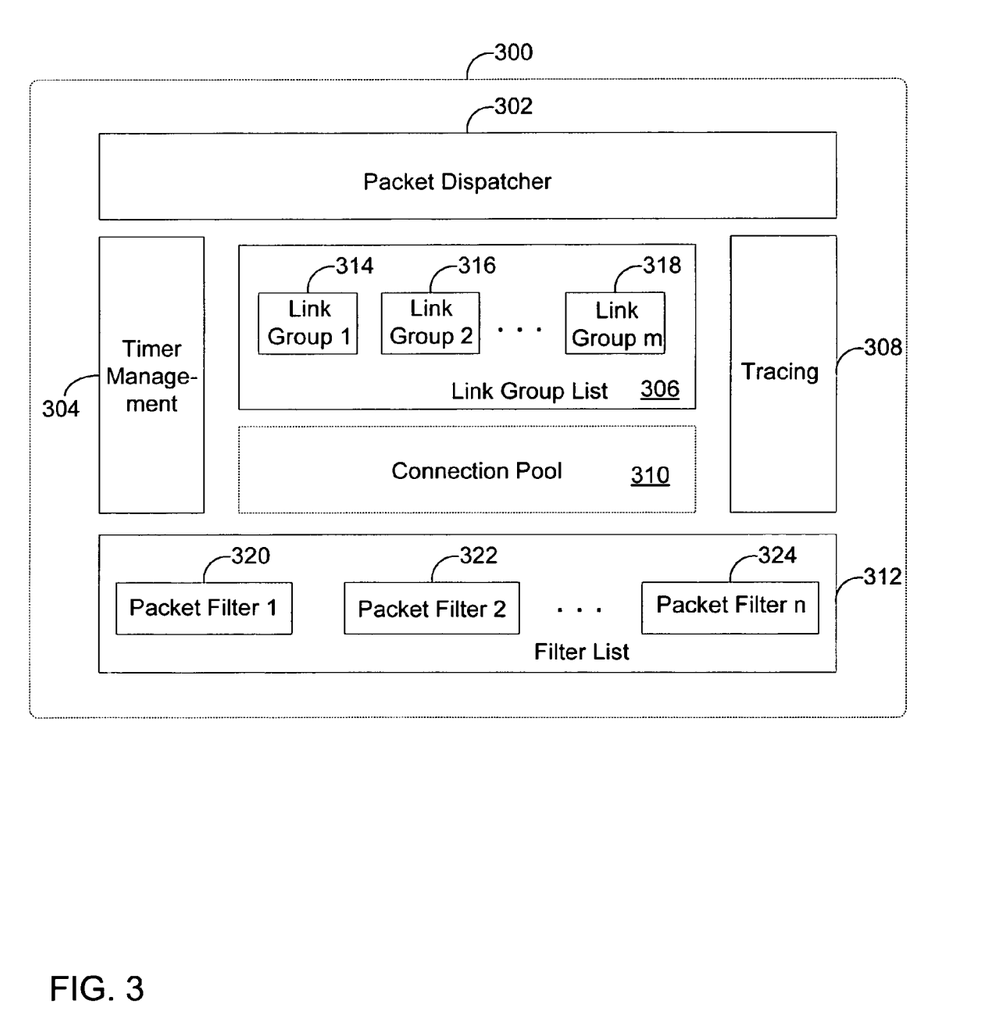
FIG. 3 is a diagram showing the architecture of core components of a network emulator driver in accordance with the invention.

The emulator driver 214 contains a number of core components, the architecture of which is illustrated in FIG. 3. After a packet is captured by the driver 300, the packet is passed to a filter list 312. The filter list 312 filters packets with respect to which the user wishes to perform emulation. The filter list 312 sends the filtered packets to a virtual network link having network characteristics based on configurations specified by the user.

The filter list 312 comprises a list of packet filters 320, 322, 324. These packet filters 320, 322, 324 have a logical OR relationship with one another. Packets are processed by the packet filters 320, 322, 324 one by one in a "first match, first process" manner. This means that a packet is processed by the first filter that establishes a match to it, such as the filter 320, and the packet is not passed to the subsequent filters. By way of a packet filter, a user can specify the local address and remote address of a network connection. Each packet filter attempts to match packets with respect to such criteria as IP version, protocol type, source IP address or mask, destination IP address or mask, port number, and NIC index. A packet filter represents a filter rule that is bound to one or more NICs on the target machine.

A connection pool component 310 is used specifically for per-connection emulation, as described further below. The connection pool 310 is not used for non-connection-based emulation.

If a packet is matched by a packet filter, the packet is delivered to a link group list component 306. The link group list 306 comprises a list of link groups or virtual channels 313, 316, 318. Each link group, such as the link group 314, comprises one or more virtual link pairs having the same emulation parameters. In one embodiment, a link group has multiple link pairs if per-connection emulation is enabled. Each link group is associated with a particular emulation configuration. Multiple network links having diverse characteristics may thus be emulated simultaneously.

Figure 4:
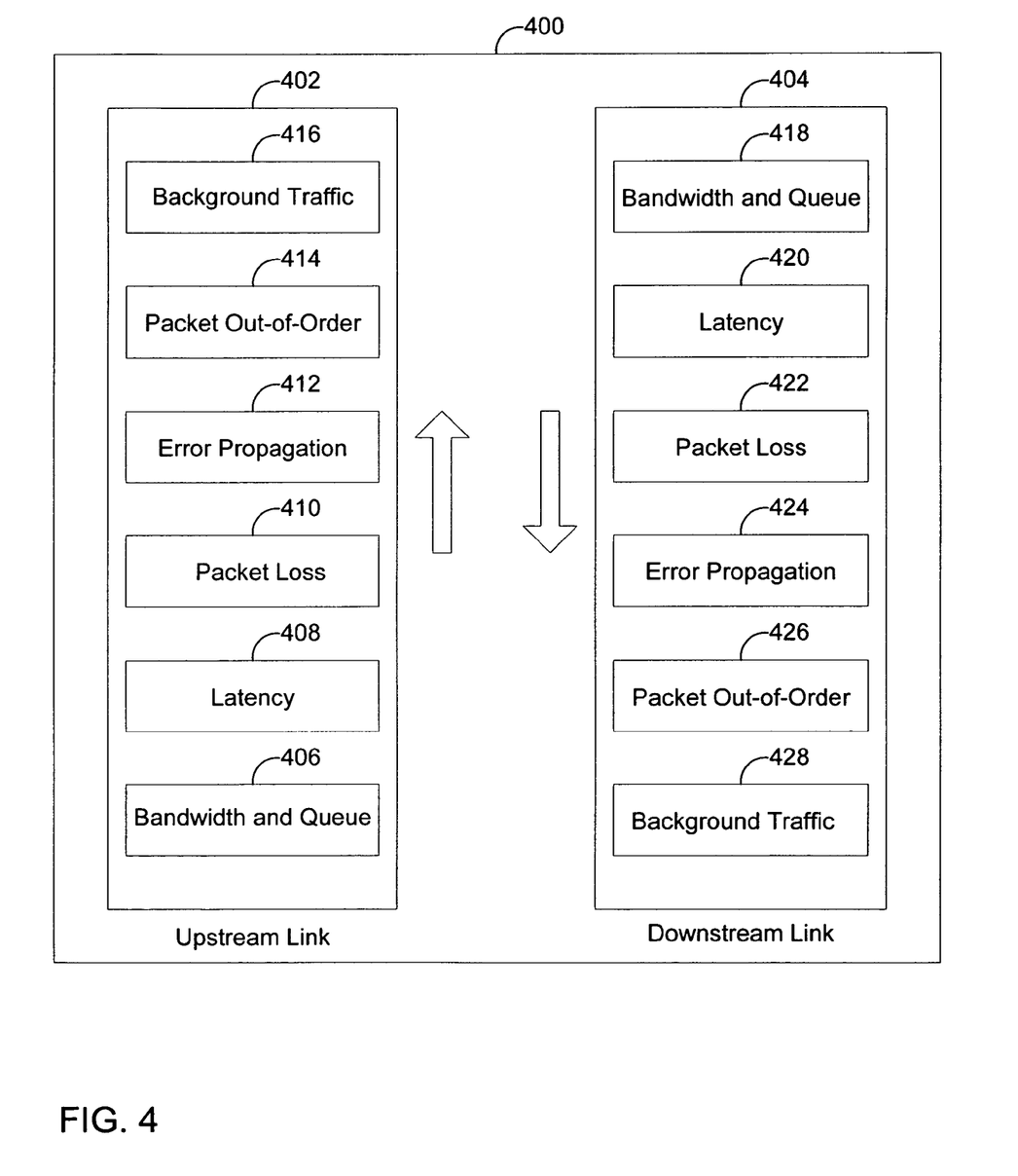
FIG. 4 is a diagram showing the structure of a virtual link pair in accordance with the invention.

The structure of a virtual link pair is shown in FIG. 4. A link pair 400 comprises an upstream virtual link 402 and a downstream virtual link 404. The upstream virtual link 402 processes packets received by the host on which the embodiment of the network emulator is running. Similarly, the downstream virtual link 404 processes packets sent by the host. All emulation procedures are performed at virtual links. As shown in FIG. 4, emulation procedures include bandwidth and queue emulation 406, 418, latency emulation 408, 420, packet loss emulation 410, 422, error propagation emulation 412, 424, packet out-of-order emulation 414, 426, and background traffic emulation 416, 428.

Returning now to FIG. 3, a timer management component 304 manages all timers created by the network emulator. Most emulation algorithms are driven by timers, including bandwidth, latency, packet out-of-order and background traffic emulations. In an embodiment, the timer management component 304 is held within an individual thread of execution.

A tracing component 308 reports status information for the packets processed by the emulator. Such status information includes, for example, the length of time for which a packet was delayed, the number of bits in the packet that were corrupted, whether the packet was lost, the bandwidth and queue configuration, and the background traffic configuration. The tracing component 308 also reports information concerning the packets themselves, such as packet length, packet headers, and length of packet data. The tracing component 308 permits the user to monitor the running status of the emulator 300. In an embodiment the tracing component 308 is disabled by default because its use entails many data exchanges between user mode and kernel mode.

After a packet is processed by a virtual link, a packet dispatcher component 302 sends out the packet.

Emulation Session

Channels meet packet filters in an emulation session. Packets matching filter rules are sent to the virtual channel which is bound to packet filters. If two packet filters overlap, the first added packet filter in the driver is valid. The unmatched packet is sent out directly. Packets coming from a NIC are sent to the same NIC after link processing. Packet filters can be bound to a NIC directly using the permanent address (MAC address) of the NIC.

If more than one virtual channel is included in a session, there are two modes for packet dispatching. In packet-based dispatch, the packet is dispatched randomly to a link with a ratio of 1/(virtual channel count). In connection-based dispatch, the first packet of a connection is dispatched to a virtual channel with the ratio 1/(virtual channel count) randomly. All packets of the same connection are then dispatched to the same virtual channel.

Different connections use different virtual channels. If all virtual channels are in use, the new connection sends packets out directly. A virtual channel is freed if there is no packet of a connection in a period (for example, a twenty second period).

Figure 5:
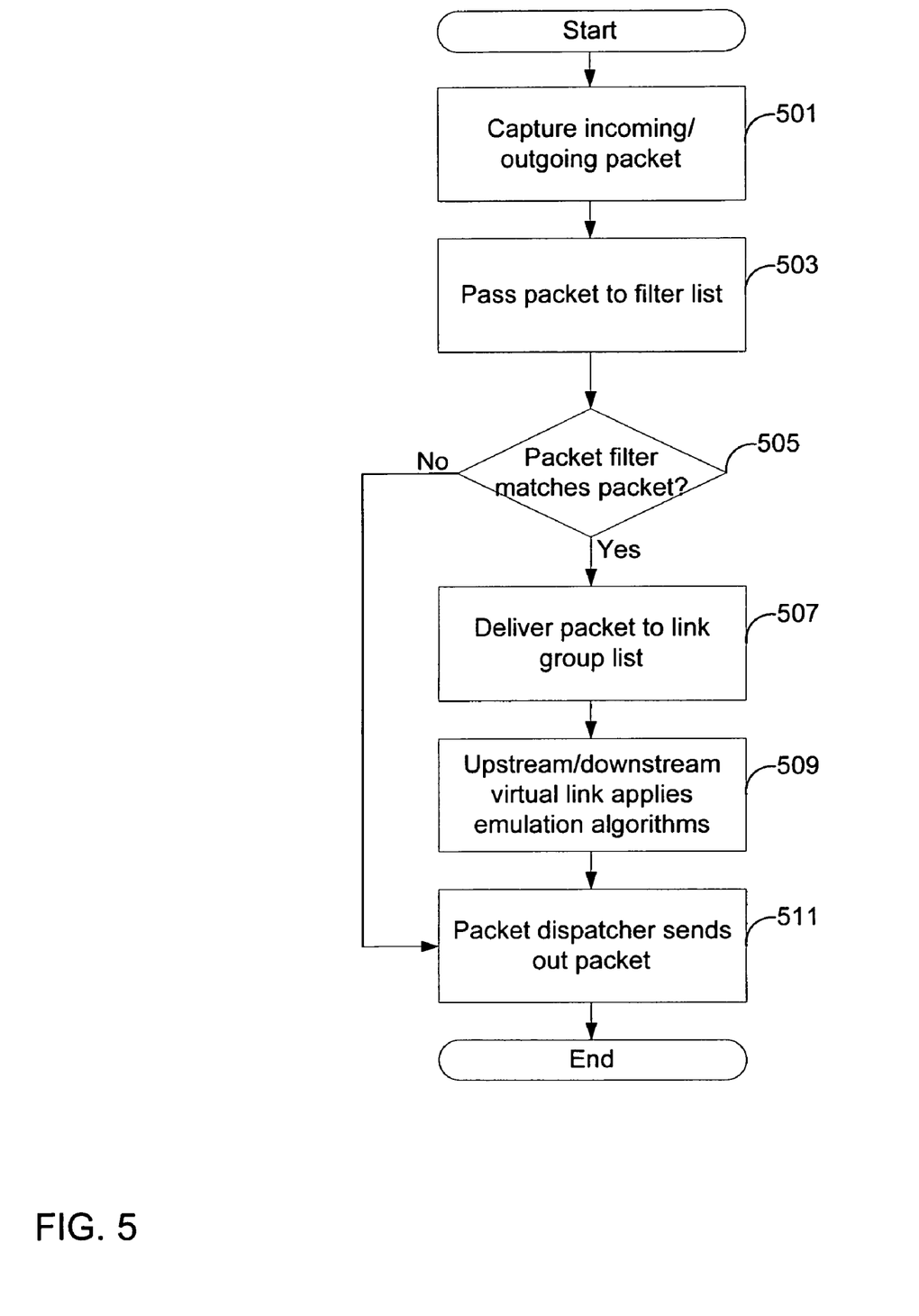
FIG. 5 is a flow diagram showing steps of a method for network emulation in accordance with the invention.

The flow diagram of FIG. 6 shows steps associated with a network emulation process in accordance with the present invention, in accordance with the description of the architecture of the invention provided above. After a start block, the process flows to block 501, at which the driver captures an incoming or outgoing packet. At block 503 the driver causes the packet to be passed to the filter list. If a packet filter in the filter list makes a match to the packet (decision block 505), the packet is delivered to the link group list at bock 507. At block 509 an upstream or downstream virtual link of a link pair in a link group applies emulation algorithms to the packet. At block 511 the packet dispatcher component sends out the packet, and the process then flows to an end block.

Configuration Modes

According to one aspect of the present invention, three emulation modes are provided: a client mode, a server mode and a router mode. In accordance with the invention, an emulator can be configured to run on a client to test applications running in client mode, such as an e-mail client application. Server mode can be used for testing server-based applications, such as an e-mail server, a network document server, and server-based real time communications applications. An emulator can also be configured to run on a router bound to virtual NICs to emulate different network characteristics with respect to a link between a client and a server. Router mode is particularly useful when performing load testing on a client-server application.

Application Programming Interface

According to one embodiment of the present invention, a set of APIs are exposed for testing distributed applications by way of a network emulator. Various network characteristics may be emulated, including bandwidth, latency, background noise, packet reorder, and error propagation.

The following presents an exemplary set of APIs, in accordance with aspects of the invention:

```
HRESULT EMULATOR_API CreateVirtualChannel    (
                        IN HANDLE hEmulator,
                        IN PacketFilterRule pFilters,
                        IN DWORD dwFilterCnt,
                        OUT HANDLE * phVC
                                                )
```
The emulator can have multiple channels. Each channel is specified by a list of packet filters.
Parameters:
    hEmulator       Emulator handle
    pFilters         Pointer to a packet filter array
    dwFilterCnt     Number of packet filters
    phVC            Pointer to the handle of the created virtual channel
Returns:
    Returns S_OK on success or an error HRESULT on failure.

```
HRESULT EMULATOR_API CreateVirtualLink   (
                        IN HANDLE hEmulator,
                        IN HANDLE hVirtualChannel,
                        IN DWORD dwInstances,
                        IN LinkRule * pUpLinkRule,
                        IN LinkRule * pDnLinkRule,
                        OUT HANDLE * phLink
                                                )
```
Create a virtual link in a virtual channel.
Parameters:
    hEmulator       Emulator handle
    hVirtualChannel The virtual channel handle
    dwInstances     Number of instances of the creating link
    pUpLinkRule     The link's upstream rule
    pDnLinkRule     The link's downstream rule
    phLink          Pointer to the created link handle
Returns:
    Returns S_OK on success, or an error HRESULT on failure.

```
HRESULT EMULATOR_API DeleteVirtualChannel    (
                        IN HANDLE hEmulator,
                        IN HANDLE hVirtualChannel
                                                )
```
Delete a virtual channel.
Parameters:
    hEmulator       Emulator handle
    hVirtualChannel Virtual channel handle
Returns:
    Returns S_OK on success or an error HRESULT on failure.

```
HRESULT EMULATOR_API DeleteVirtualLink   (
                        IN HANDLE hEmulator,
                        IN HANDLE hVirtualChannel,
                        IN HANDLE hVirtualLink
                                                )
```
Delete a virtual link.
Parameters:
    hEmulator       Emulator handle
    hVirtualChannel Virtual channel handle
    hVirtualLink    Virtual link handle
Returns:
    Returns S_OK on success or an error HRESULT on failure.

```
HRESULT EMULATOR_API GetTraceData    (
                        IN HANDLE hEmulator,
                        OUT TraceData * pTraceData,
                        IN OUT DWORD * pdwBufferSize
                                                )
```
Get emulator trace data.
Parameters:
    hEmulator       Emulator handle
    pTraceData      Pointer to trace data returned by the emulator
    pdwBufferSize   The value is the pointer to the size of the trace buffer. The value out is the pointer to the number of bytes written into the data buffer.
Returns:
    Returns S_OK on success or an error HRESULT on failure.

```
HRESULT EMULATOR_API GetVirtualChannel  (
                        IN HANDLE hEmulator,
                        IN HANDLE hVirtualChannel,
                        OUT PacketFilterRule * pFilters,
                        IN OUT DWORD * pdwFilterCnt
                        )
    Get packet filters of a virtual channel.
    Parameters:
        hEmulator           Emulator handle
        hVirtualChannel     Virtual channel handle
        pFilters            Pointer to a packet filter array
        pdwFilterCnt        The value in is the length of
                            pFilters. The value out is the number
                            of filters returned.
    Returns:
        Returns S_OK on success or an error HRESULT on
        failure.
HRESULT EMULATOR_API GetVirtualLink   (
                        IN HANDLE hEmulator,
                        IN HANDLE hVirtualChannel,
                        IN HANDLE hVirtualLink,
                        OUT DWORD * pdwInstances,
                        OUT LinkRule * pUpLinkRule,
                        OUT LinkRule * pDnLinkRule
                        )
    Get link rules and the number of instances of a virtual
link.
    Parameters:
        hEmulator           Emulator handle
        hVirtualChannel     Virtual channel handle
        hVirtualLink        Link handle
        pdwInstances        Pointer to the number of instances of
                            the created link
        pUpLinkRule         Pointer to the upstream link rule
        pDnLinkRule         Pointer to the downstream link rule
    Returns:
        Returns S_OK on success or an error HRESULT on
        failure.
HRESULT EMULATOR_API InitializeEmulator  (
                        IN OUT DWORD * pdwVersion,
                        OUT HANDLE * phEmulator
                        )
    Should be called before any other emulator functions to
get an emulator handle.
    Parameters:
        pdwVersion          The value in is the emulator version
                            requested. The value out is the
                            supported version, which could be
                            higher than the requested version.
        phEmulator          Emulator handle
    Returns:
        Returns S_OK on success or an error HRESULT on
        failure.
HRESULT EMULATOR_API ModifyVirtualChannel   (
                        IN HANDLE hEmulator,
                        IN HANDLE hVirtualChannel,
                        IN PacketFilterRule * pFilters,
                        IN DWORD * dwFilterCnt
                        )
    Parameters:
        hEmulator           Emulator handle
        hVirtualChannel     Virtual channel handle
        pFilters            Pointer to a packet filter array
        dwFilterCnt         Number of packet filters
    Returns:
        Returns S_OK on success or an error HRESULT on
        failure.
HRESULT EMULATOR_API ModifyVirtualLink   (
                        IN HANDLE hEmulator,
                        IN HANDLE hVirtualChannel,
                        IN HANDLE hVirtualLink,
                        IN LinkRule * pUpLinkRule,
                        IN LinkRule * pDnLinkRule
                        )
    Modify an existing link.
    Only link rules can be modified. The number of link
instances cannot be modified.
    Parameters:
        hEmulator           Emulator handle
        hVirtualChannel     Virtual channel handle
        hVirtualLink        Virtual link handle
        pUpLinkRule         Pointer to the upstream link rule
        pDnLinkRule         Pointer to the downstream link rule
    Returns:
        Returns S_OK on success or an error HRESULT on
        failure.
HRESULT EMULATOR_API SetTraceInfo   (
                        IN HANDLE hEmulator,
                        IN BOOL fEnabled,
                        IN DWORD dwPacketSize,
                        IN DWORD dwBufferSize
                        )
    Set emulator trace information.
    Parameters:
        hEmulator           Emulator handle
        fEnabled            TRUE enables trace,
                            FALSE disables trace
        dwPacketSize        Size of each trace packet
        dwBufferSize        Size of the trace buffer
    Returns:
        Returns S_OK on success or an error HRESULT on
        failure.
HRESULT EMULATOR_API ShutdownEmulator(
                        IN HANDLE hEmulator)
    Should be the final emulator function to be called.
    Parameters:
        hEmulator           Emulator handle
    Returns:
        Returns S_OK on success or an error HRESULT on
        failure.
HRESULT EMULATOR_API StartEmulator( IN HANDLE hEmulator)
    Start the emulator to run an emulation.
    Parameters:
        hEmulator           Emulator handle
    Returns:
        Returns S_OK on success or an error HRESULT on
        failure.
HRESULT EMULATOR_API StopEmulator (
                        IN HANDLE hEmulator,
                        IN DWORD dwTimeout,
                        IN BOOL fForce
                        )
    Stop the emulation.
    Parameters:
        hEmulator           Emulator handle
        dwTimeout           Maximum number of seconds to wait until
                            the emulation stops
        fForce              If set to true, the emulation is forced to
                            terminate after the timeout
    Returns:
        Returns S_OK on success or an error HRESULT on
        failure.
```

Preferred embodiments of the present invention are described herein, including the best mode known to the inventors for carrying out the invention. In view of the many possible embodiments to which the principles of this invention may be applied, it should be recognized that the embodiments described herein are meant to be illustrative only and should not be understood to limit the scope of the invention. Those having skill in the art will recognize that the described embodiments can be modified in arrangement and detail without departing from the spirit of the invention. Therefore, the invention as described herein contemplates all such embodiments as may come within the scope of the following claims and equivalents thereof.

What is claimed is:

1. A method for providing an interface to a user application for configuring a network emulator, the method comprising:

exposing a computer-implemented function for creating a virtual channel;

exposing a computer-implemented function for creating a virtual link in the virtual channel;

exposing a computer-implemented function for deleting the virtual channel;
exposing a computer-implemented function for deleting the virtual link;
exposing a computer-implemented function for obtaining trace data; wherein exposing the computer-implemented function for obtaining the trace data further comprises setting an output parameter to point to the trace data returned by the emulator;
exposing a computer-implemented function for obtaining at least one packet filter for the virtual channel;
exposing a computer-implemented function for obtaining a link ride and the number of instances of the virtual link;
exposing a computer-implemented function for initializing the emulator;
exposing a computer-implemented function for modifying the virtual channel;
exposing a computer-implemented function for modifying the virtual link;
exposing a computer-implemented function for setting trace information for the emulator;
exposing a computer-implemented function for shutting down the emulator; and
exposing a computer-implemented function for stopping an emulation; wherein the exposed computer-implemented functions are utilized within the interface to configure the network emulator.

2. The method of claim 1, wherein exposing the function for creating the virtual channel permits creation of a plurality of channels.

3. The method of claim 1, wherein exposing the function for creating the virtual channel further comprises:
receiving an emulator handle;
receiving a parameter associated with a packet filter array;
receiving a parameter representing a number of packet filters; and
setting an output parameter to a handle for the virtual channel.

4. The method of claim 1, wherein exposing the function for creating the virtual link further comprises:
receiving an emulator handle;
receiving a virtual channel handle;
receiving a parameter representing a number of instances of the link;
receiving a parameter representing an upstream rule for the link;
receiving a parameter representing a downstream rule for the link; and
setting an output parameter to a handle for the virtual link.

5. The method of claim 1, wherein exposing the function for deleting the virtual channel further comprises:
receiving an emulator handle; and
receiving a virtual channel handle.

6. The method of claim 1, wherein exposing the function for deleting the virtual link further comprises:
receiving an emulator handle;
receiving a virtual channel handle; and
receiving a virtual link handle.

7. The method of claim 1, wherein exposing the function for obtaining the trace data further comprises:
receiving an emulator handle;
setting an output parameter to point to the trace data returned by the emulator; and
receiving a pointer to the size of a buffer for the trace data; and
setting the pointer to point to the number of bytes written to the buffer.

8. The method of claim 1, wherein exposing the function for obtaining the at least one packet filter for the virtual channel further comprises:
receiving an emulator handle;
receiving a virtual channel handle;
setting an output parameter to point to a packet filter array;
receiving a pointer to the size of the packet filter array; and
setting the pointer to point to the number of the at least one packet filter returned.

9. The method of claim 1, wherein exposing the function for obtaining the link rule and the number of instances of the virtual link further comprises:
receiving an emulator handle;
receiving a virtual channel handle;
receiving a link handle;
setting a first output parameter to point to the number of instances of the virtual link;
setting a second output parameter to point to an upstream link rule; and
setting a third output parameter to point to a downstream link rule.

10. The method of claim 1, wherein exposing the function for initializing the emulator further comprises:
receiving a first parameter representing a requested emulator version;
setting the first parameter to a value representing a supported emulator version; and
setting an output parameter to an emulator handle.

11. The method of claim 1, wherein exposing the function for modifying the virtual channel further comprises:
receiving an emulator handle;
receiving a virtual channel handle;
receiving a pointer to a packet filter array; and
receiving a parameter representing the number of packet filters.

12. The method of claim 1, wherein exposing the function for modifying the virtual link further comprises:
receiving an emulator handle;
receiving a virtual channel handle;
receiving a virtual link handle;
receiving a pointer to an upstream link rule; and
receiving a pointer to a downstream link rule.

13. The method of claim 1, wherein exposing the function for setting the trace information for the emulator further comprises:
receiving an emulator handle;
receiving a boolean parameter for enabling and disabling trace;
receiving a parameter representing the size of a trace packet; and
receiving a parameter representing a trace buffer size.

14. The method of claim 1, wherein exposing the function for stopping the emulation further comprises:
receiving an emulator handle;
receiving a parameter representing a maximum time to wait until the emulation stops; and
receiving a boolean parameter for forcing the emulation to terminate after a timeout.

15. A system for configuring a network emulator by way of a user application comprising:
a processor and a computer-readable storage medium having computer-executable instructions for providing an application programming interface to the user application for configuring a network emulator; wherein the application programming interface provides:

an exposed function for creating a virtual channel;
an exposed function for creating a virtual link in the virtual channel;
an exposed function for deleting the virtual channel;
an exposed function for deleting the virtual link;
an exposed function for obtaining trace data;
an exposed function for obtaining at least one packet filter for the virtual channel;
an exposed function for obtaining a link rule and the number of instances of the virtual link;
an exposed function for initializing the emulator; wherein the exposed function for initializing the emulator further comprises: receiving a first parameter representing a requested emulator version; and setting an output parameter to an emulator handle;
an exposed function for modifying the virtual channel;
an exposed function for modifying the virtual link;
an exposed function for setting trace information for the emulator;
an exposed function for shutting down the emulator; and
an exposed function for stopping an emulation; wherein the exposed functions are accessed to configure the network emulator.

16. A computer-readable medium having computer-executable instructions for providing an interface to a user application for configuring a network emulator, the instructions comprising:
    exposing a computer-implemented function for creating a virtual channel;
    exposing a computer-implemented function for creating a virtual link in the virtual channel;
    exposing a computer-implemented function for deleting the virtual channel;
    exposing a computer-implemented function for deleting the virtual link;
    exposing a computer-implemented function for obtaining trace data; wherein exposing the function for obtaining the trace data further comprises receiving an emulator handle and setting an output parameter to point to the trace data returned by the emulator;
    exposing a computer-implemented function for obtaining at least one packet filter for the virtual channel;
    exposing a computer-implemented function for obtaining a link rule and the number of instances of the virtual link;
    exposing a computer-implemented function for initializing the emulator;
    exposing a computer-implemented function for modifying the virtual channel;
    exposing a computer-implemented function for modifying the virtual link;
    exposing a computer-implemented function for setting trace information for the emulator;
    exposing a computer-implemented function for shutting down the emulator; and
    exposing a computer-implemented function for stopping an emulation.

17. The computer-readable medium of claim 16, wherein exposing the function for creating the virtual channel permits creation of a plurality of channels.

18. The computer-readable medium of claim 16, wherein exposing the function for creating the virtual channel further comprises:
    receiving an emulator handle;
    receiving a parameter associated with a packet filter array;
    receiving a parameter representing a number of packet filters; and
    setting an output parameter to a handle for the virtual channel.

19. The computer-readable medium of claim 16, wherein exposing the function for creating the virtual link further comprises:
    receiving an emulator handle;
    receiving a virtual channel handle;
    receiving a parameter representing a number of instances of the link;
    receiving a parameter representing an upstream rule for the link;
    receiving a parameter representing a downstream rule for the link; and
    setting an output parameter to a handle for the virtual link.

20. The computer-readable medium of claim 16, wherein exposing the function for deleting the virtual channel further comprises:
    receiving an emulator handle; and
    receiving a virtual channel handle.

21. The computer-readable medium of claim 16, wherein exposing the function for deleting the virtual link further comprises:
    receiving an emulator handle;
    receiving a virtual channel handle; and
    receiving a virtual link handle.

22. The computer-readable medium of claim 16, wherein exposing the function for obtaining the trace data further comprises:
    receiving a pointer to the size of a buffer for the trace data; and
    setting the pointer to point to the number of bytes written to the buffer.

23. The computer-readable medium of claim 16, wherein exposing the function for obtaining the at least one packet filter for the virtual channel further comprises:
    receiving an emulator handle;
    receiving a virtual channel handle;
    setting an output parameter to point to a packet filter array;
    receiving a pointer to the size of the packet filter array; and
    setting the pointer to point to the number of the at least one packet filter returned.

24. The computer-readable medium of claim 16, wherein exposing the function for obtaining the link rule and the number of instances of the virtual link further comprises:
    receiving an emulator handle;
    receiving a virtual channel handle;
    receiving a link handle;
    setting a first output parameter to point to the number of instances of the virtual link;
    setting a second output parameter to point to an upstream link rule; and
    setting a third output parameter to point to a downstream link rule.

25. The computer-readable medium of claim 16, wherein exposing the function for initializing the emulator further comprises:
    receiving a first parameter representing a requested emulator version;
    setting the first parameter to a value representing a supported emulator version; and
    setting an output parameter to an emulator handle.

26. The computer-readable medium of claim 16, wherein exposing the function for modifying the virtual channel further comprises:
    receiving an emulator handle;
    receiving a virtual channel handle;
    receiving a pointer to a packet filter array; and receiving a parameter representing the number of packet filters.

27. The computer-readable medium of claim 16, wherein exposing the function for modifying the virtual link further comprises:
- receiving an emulator handle;
- receiving a virtual channel handle;
- receiving a virtual link handle;
- receiving a pointer to an upstream link rule; and
- receiving a pointer to a downstream link rule.

28. The computer-readable medium of claim 16, wherein exposing the function for setting the trace information for the emulator further comprises:
- receiving an emulator handle;
- receiving a boolean parameter for enabling and disabling trace;
- receiving a parameter representing the size of a trace packet; and
- receiving a parameter representing a trace buffer size.

29. The computer-readable medium of claim 16, wherein exposing the function for stopping the emulation further comprises:
- receiving an emulator handle;
- receiving a parameter representing a maximum time to wait until the emulation stops; and
- receiving a boolean parameter for forcing the emulation to terminate after a timeout.

* * * * *